United States Patent
Robitaille et al.

(10) Patent No.: US 9,503,328 B2
(45) Date of Patent: *Nov. 22, 2016

(54) SYSTEMS AND METHODS OF DISCOVERING AND CONTROLLING DEVICES WITHOUT EXPLICIT ADDRESSING

(71) Applicant: Accedian Networks Inc., Saint-Laurent (CA)

(72) Inventors: Claude Robitaille, St-Placide (CA); Pierre Bouffard, Ste-Marthe-sur-Lac (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,306

(22) Filed: Feb. 16, 2016

(65) Prior Publication Data

US 2016/0164742 A1    Jun. 9, 2016

Related U.S. Application Data

(63) Continuation of application No. 14/266,866, filed on May 1, 2014, now Pat. No. 9,294,358, which is a continuation of application No. 13/552,063, filed on Jul. 18, 2012, now Pat. No. 8,751,615.

(51) Int. Cl.
*H04L 12/24* (2006.01)
*H04L 29/12* (2006.01)
*H04L 12/26* (2006.01)

(52) U.S. Cl.
CPC ........... *H04L 41/12* (2013.01); *H04L 41/5009* (2013.01); *H04L 43/08* (2013.01); *H04L 61/35* (2013.01); *H04L 61/6022* (2013.01)

(58) Field of Classification Search
USPC .................. 709/224, 220, 222, 230
See application file for complete search history.

(56) References Cited

U.S. PATENT DOCUMENTS 6,166,688 A    12/2000    Cromer
6,367,037 B1    4/2002    Remer et al.
(Continued)

FOREIGN PATENT DOCUMENTS

EP    2421200 A1    2/2012
KR    20090004239 A    1/2009
(Continued)

OTHER PUBLICATIONS

Thomas, G. "Incorporating Media Converters." Contemporary Control Systems, Inc. the Extension. vol. 7, No. 6, Nov. 2006 [online] [retrieved on Dec. 4, 2013]. Retrieved from the Internet: <URL: http://www.ccontrols.com/pdf/Extv7n6.pdf> (4 pages).
(Continued)

*Primary Examiner* — Jude Jean Gilles
(74) *Attorney, Agent, or Firm* — Nixon Peabody LLP

(57) ABSTRACT

A method of discovering a device in a communication network having multiple interconnected nodes includes continuously monitoring, by a device to be discovered, any IP packets sent by a discoverer. The method further includes transmitting, by the discoverer, an IP packet destined for a downstream device and receiving, by the device to be discovered, the IP packet. The method further includes determining, by the device to be discovered, whether the IP packet is intended for the device to be discovered. If the IP packet is not intended for the device to be discovered, retransmitting, by the device to be discovered, the IP packet to the downstream device via an egress port of the device to be discovered.

14 Claims, 6 Drawing Sheets

(56) References Cited

U.S. PATENT DOCUMENTS

| | | | |
|---|---|---|---|
| 6,865,602 | B1 | 3/2005 | Nijemcevic et al. |
| 6,987,743 | B2 | 1/2006 | Chen et al. |
| 7,039,688 | B2 | 5/2006 | Matsuda |
| 7,111,163 | B1* | 9/2006 | Haney ............... H04L 12/4633 709/227 |
| 7,225,243 | B1 | 5/2007 | Wilson |
| 7,317,926 | B1 | 1/2008 | Cloutier et al. |
| 7,412,515 | B2 | 8/2008 | Kupst |
| 7,570,657 | B1 | 8/2009 | Lo |
| 7,778,162 | B2 | 8/2010 | Yu |
| 7,787,455 | B2 | 8/2010 | Cherchali et al. |
| 7,912,075 | B1 | 3/2011 | Holland et al. |
| 8,023,465 | B2 | 9/2011 | Prehofer |
| 8,098,671 | B1 | 1/2012 | Deruijter et al. |
| 8,233,437 | B2 | 7/2012 | Tazaki |
| 8,509,072 | B2 | 8/2013 | Lee et al. |
| 8,571,029 | B1 | 10/2013 | Aggarwal et al. |
| 8,751,615 | B2* | 6/2014 | Robitaille ............... H04L 41/12 370/328 |
| 8,868,236 | B2* | 10/2014 | Brogardh ............... B25J 9/162 700/254 |
| 9,294,358 | B2* | 3/2016 | Robitaille ............... H04L 41/12 |
| 2002/0075870 | A1 | 6/2002 | De Azevedo |
| 2002/0077117 | A1 | 6/2002 | Cloutier et al. |
| 2002/0112004 | A1 | 8/2002 | Reid et al. |
| 2003/0046706 | A1* | 3/2003 | Rakib ............... H04L 45/10 725/111 |
| 2003/0053421 | A1 | 3/2003 | Yoshimura |
| 2003/0056008 | A1 | 3/2003 | Russell et al. |
| 2003/0225864 | A1 | 12/2003 | Gardiner et al. |
| 2003/0229809 | A1 | 12/2003 | Wexler et al. |
| 2004/0090918 | A1* | 5/2004 | McLendon ............ H04L 12/56 370/237 |
| 2004/0249906 | A1 | 12/2004 | Olbricht et al. |
| 2005/0281256 | A1 | 12/2005 | Taipale et al. |
| 2006/0140139 | A1 | 6/2006 | DiSilvestro |
| 2006/0274671 | A1 | 12/2006 | Budampati et al. |
| 2007/0019598 | A1 | 1/2007 | Prehofer |
| 2008/0140815 | A1 | 6/2008 | Brant et al. |
| 2008/0153477 | A1 | 6/2008 | Cloutier et al. |
| 2009/0085806 | A1 | 4/2009 | Piersol et al. |
| 2009/0251867 | A1 | 10/2009 | Sharma |
| 2009/0323647 | A1 | 12/2009 | Park |
| 2010/0054154 | A1 | 3/2010 | Lambert et al. |
| 2010/0274917 | A1 | 10/2010 | Cherchali et al. |
| 2010/0280858 | A1 | 11/2010 | Bugenhagen |
| 2011/0075590 | A1 | 3/2011 | Kormann |
| 2011/0283140 | A1* | 11/2011 | Stevens ............... H04L 12/2697 714/27 |
| 2011/0286396 | A1* | 11/2011 | Kato ............... H04W 92/02 370/328 |
| 2011/0305150 | A1 | 12/2011 | Haver et al. |
| 2012/0014383 | A1 | 1/2012 | Geromel et al. |
| 2012/0105877 | A1 | 5/2012 | Wakamatsu |
| 2012/0122428 | A1 | 5/2012 | Stephens |
| 2012/0173704 | A1 | 7/2012 | Lingen |
| 2012/0230186 | A1 | 9/2012 | Lee et al. |
| 2012/0320751 | A1 | 12/2012 | Zhu |
| 2013/0067065 | A1 | 3/2013 | Navasivasakthivelsamy |
| 2013/0121346 | A1* | 5/2013 | Mitchell ............... H04L 69/163 370/465 |
| 2013/0346591 | A1 | 12/2013 | Carroll et al. |
| 2014/0025806 | A1* | 1/2014 | Robitaille ............... H04L 41/12 709/224 |

FOREIGN PATENT DOCUMENTS

| | | |
|---|---|---|
| WO | 2010/097514 | 9/2010 |
| WO | 2011/054006 | 5/2011 |
| WO | 2014/013317 | 1/2014 |
| WO | 2014/013318 | 1/2014 |
| WO | 2014/013320 | 1/2014 |

OTHER PUBLICATIONS

Avago Technologies. "1000BASE-T Interface and Functionality of ABCU-57xxRZ Gigabit Ethernet Small Form Puggable Electrical Transceivers Over Category 5 Unshielded Twisted Pair Cable—Application Note 5286." XP055091424, Sep. 14, 2010 [online] [retrieved on Dec. 4, 2013]. Retrieved from the Internet <URL: http://www.avagotech.com/docs/AV02-2643EN‎> (16 pages).

Cheshire, et al. "Dynamic Configuration of IPv4 Link-Local Addresses," May 2005, 33 pages.

Plummer, "An Ethernet Address Resolution Protocol—or—Converting Network Protocol Addresses to 48.bit Ethernet Address for Transmission on Ethernet Hardware," Nov. 1982, 10 pages.

Malkin, "Traceroute Using an IP Option," Jan. 1993, 7 pages.

https://lkml.org/lkml/2005/10/19/46 on Oct. 16, 2012, Ingo Molnar, Oct. 19, 2005, 7 pages.

Sosnoski, "Classworking toolkit: Combining source and bytecode generation," Oct. 4, 2005, 9 pages.

Cyclone IV Device Handbook, vol. 1, Altera, Dec. 2010 (478 pages).

IEEE Standard for Information Technology, Part 3: Carrier Sense Multiple Access with Collision Detection (CSMA/CD) access method and Physical Layer specifications, 2008 (315 pages).

Gigabit Ethernet Auto-Negotiation, by Rich Hernandez, www.dell.com/powersolutions, 1999 (6 pages).

Rad Data Communications, Rad & Miniature & SFP-S & SFF 8439 Specifications, Dec. 2007, 48 pages.

Rad Data Communications, Data Sheet—MIRICI-155 Intelligent Miniature GbE over STM-1/OC-3 NTU, 2007-2010, 4 pages.

Drimer and Kuhn, "A Protocol for Secure Remote Updates of FPGA Configurations", pp. 50-61, 2009, Lecture Notes in Computer Science vol. 5453, 12 pages.

International Search Report and Written Opinion mailed Nov. 26, 2013 which issued in International Patent Application No. PCT/IB2013/001559 (8 pages).

International Search Report and Written Opinion mailed Dec. 4, 2013 which issued in corresponding International Patent Application No. PCT/IB2013/001557 (9 pages).

International Search Report and Written Opinion mailed Dec. 9, 2013 which issued in International Patent Application No. PCT/IB2013/001556 (7 pages).

Extended European Search Report mailed Dec. 18, 2013 which issued in European Patent Application No. 13183360.0 (11 pages).

* cited by examiner

SYSTEMS AND METHODS OF DISCOVERING AND CONTROLLING DEVICES WITHOUT EXPLICIT ADDRESSING

CROSS REFERENCE TO RELATED APPLICATIONS

This application is a continuation of U.S. application Ser. No. 14/266,866, filed May 1, 2014, now allowed, which is a continuation of and claims priority to U.S. application Ser. No. 13/552,063, filed Jul. 18, 2012, now U.S. Pat. No. 8,751,615, each of which is hereby incorporated by reference herein in its entirety. This application incorporates by reference in their entireties the following applications, all of which have the same filing date as the present application: U.S. application Ser. No. 13/551,804, "Programmable Small Form-Factor Pluggable Module," by Robitaille and Ostiguy; U.S. application Ser. No. 13/551,998 "Systems and Methods of Detecting and Assigning IP Addresses to Devices with ARP Requests," by Robitaille and Lemieux; U.S. application Ser. No. 13/552,022, "Systems and Methods of Using Beacon Messages to Discover Devices Across Subnets," by Robitaille and Bouffard and U.S. application Ser. No. 13/551,984, "Systems and Methods of Installing and Operating Devices without Explicit Network Addresses," by Robitaille and Lemieux.

TECHNICAL FIELD

This invention is directed towards addressing the need for discovering when a device configured to perform Service Operations Administration and Maintenance (SOAM) functions has been connected on a network without being assigned unique addressing information. This discovery process can be carried out by a discoverer/tester that is located in the network. The discoverer could either be implemented in a centralized manner or a distributed manner.

BACKGROUND

Network operators are looking to deploy Service Operations Administration and Maintenance (SOAM) devices at different points inside their network infrastructure and may, at times, decide to redeploy some of the devices as their network topology and service offerings evolve. In order to reduce the setup time of these devices, it is useful to limit and ideally eliminate the need to manually re-configure these devices as they are installed or redeployed. Furthermore, since these SOAM devices are not always permanently installed in a given network, it is desirable to avoid having to reserve layer-3 addresses for these devices.

BRIEF SUMMARY

There is therefore a need to be able to discover a device in a network when it may not actively participate in the normal network protocols that are in use and therefore not have unique addressing information at layer 3. It should also be noted that most of the time, the IDs or labels used by the protocols are not the same in both directions. Since the SOAM device is not actively participating in the underlying communication protocols (e.g., Multiprotocol Label Switching (MPLS), Layer 2 Tunneling Protocol Version 3 (L2TPv3), GPRS Tunneling Protocol User Plane (GTP-U), etc.), the device (e.g., Small Form-Factor Pluggable Device (SFP), Network Interface Device (NID), etc.) does not know which ID or label to use to communicate. The detection or configuration of the addressing information for a specific tunnel is assumed to have already taken place before the steps covered by this invention.

The SOAM device must also be able to be discovered without (but not excluding) being pre-programmed with information specific to the network or the control infrastructure.

According to one aspect of the present invention, a method for discovering a device in a communication network having multiple interconnected nodes includes continuously monitoring, by a device to be discovered, any IP packets sent by a discoverer. The method further includes transmitting, by the discoverer, an IP packet destined for a downstream device and receiving, by the device to be discovered, the IP packet. The method further includes determining, by the device to be discovered, whether the IP packet is intended for the device to be discovered. If the IP packet is not intended for the device to be discovered, retransmitting, by the device to be discovered, the IP packet to the downstream device via an egress port of the device to be discovered.

According to a further aspect of the present invention, a method for discovering a device in a communication network having multiple interconnected nodes includes continuously monitoring, by a device to be discovered any IP packets sent by a discoverer inside a layer-3 tunnel established between the discoverer and a remote node. The method further includes transmitting, by the discoverer, an IP packet to the remote node and receiving, by the device to be discovered, the IP packet. The method further includes determining, by the device to be discovered, whether the IP packet is intended for the device to be discovered. If the device to be discovered determined that the IP packet is not intended for the device to be discovered, retransmitting to the remote node, by the device to be discovered, the IP packet via an egress port of the device to be discovered.

According to an additional aspect of the present invention, a method of discovering a device in a communication network having multiple interconnected nodes includes continuously monitoring, by a first device to be discovered, any IP packets sent by a discoverer. The method further includes transmitting, by the discoverer, a first IP packet with a frame to a downstream device and receiving, by the first device to be discovered, the first IP packet with the frame. The first device to be discovered determines whether the first IP packet has a User Datagram Protocol (UDP) port number that matches an internet assigned numbers authority (IRNA) assigned UDP port number. The first device to be discovered processes the first IP packet with the frame to verify that the packet is a discovery type packet. If the first device to be discovered detects that the first IP packet is a discovery type packet, the first device to be discovered verifies that discovery is activated for the first device to be discovered. If the discovery is activated for the first device to be discovered, the first device to be discovered sends an advertisement to the discoverer. If the first device to be discovered detects that the IP packet is not a discovery type packet or if the discovery is not activated for the first device to be discovered, the first device to be discovered retransmits the first IP packet to the downstream device via an egress port of the first device to be discovered.

According to an additional aspect of the present invention, a system of discovering a device in a communication network having multiple interconnected nodes includes a first device to be discovered including a first egress port; a discoverer; and a downstream device, wherein the first device to be discovered is located between the discoverer and the downstream device. The first device to be discovered is configured to continuously monitor any IP packets sent by the discoverer destined for the downstream device. The first device to be discovered is further configured to receive a first IP packet and to determine whether the first IP packet has a User Datagram Protocol (UDP) port number that matches an internet assigned numbers authority (IRNA) assigned UDP port number and whether the first IP packet is a discovery type packet. The first device is configured to send an advertisement to the discoverer if the first device to be discovered detects that the first IP packet is a discovery type packet and if discovery is activated for the first device to be discovered or to retransmit the first IP packet to the downstream device via the first egress port if the first IP packet is not a discovery type packet or if discovery is not activated.

BRIEF DESCRIPTION OF THE DRAWINGS

The foregoing and other advantages of the present disclosure will become apparent upon reading the following detailed description and upon reference to the drawings.

Figure 1:
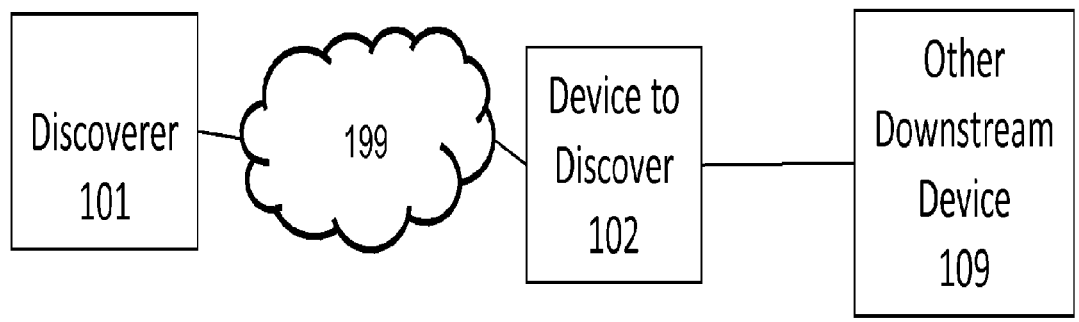
FIG. 1 illustrates a network where a single device is ready to be discovered by a discoverer node.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Network Operators increasingly need to perform SOAM and other management functions to reduce costs and improve the initial activation of their network as well as the on-going operation and service offerings. Depending on the operating preferences of the network operator, the SOAM functions may be performed by devices that are not necessarily permanently installed in a given network or subnetwork. Furthermore, some network operators are looking to simplify and shorten the amount of time it requires to deploy and configure the devices used for the SOAM functions. It is preferable to avoid allocating unique layer-3 addresses to these devices in order to save time, money and avoid temporary addressing changes by preserving the layer-3 addressing space as is.

Some network operators further rely on third party operators to provide additional services, such as backhaul for wireless towers. These third party operators often have to meet strict service level assurance guarantees and will therefore have to install similar, if not identical, SOAM devices to monitor the performance of the network operators and deliver the management reporting demanded by the network operators. Network service management applications include order manager, trouble manager, billing manager, customer service manager, service level reporter and any combination thereof.

The presence of like-devices across the same global network infrastructure but falling under different management domains needs to be taken into account and the management platforms of the respective operators must not interfere with one another. Different management domains may include an Internet Protocol (IP) domain, a Frame Relay (FR) domain, an optical domain, a Synchronous Optical Network (SONET) domain, a Synchronous Digital Hierarchy (SDH) domain, an Asynchronous Transfer Mode (ATM) domain, a circuit-switched domain, and any combination thereof.

Different types of devices can be discovered in the network using one of the following embodiments. The term discoverer is used to describe a system (e.g., a testing unit, a router, a remote node, etc.) that is local or remote to the subnet where the plurality of devices to be discovered are located. In order to detect an eventual restart of a discovered device, the discovered device may generate a unique discoverer instance ID whenever it is restarted. This discoverer instance ID should then be inserted in each discovery and other management packets to allow a discovered device to detect an eventual restart of a discoverer and therefore revert to an undiscovered state until it is formally discovered again as per the methods and techniques described in this invention.

The concept is to make sure the devices to discover are in the data path of the network traffic and are programmed to watch for specific types of messages from upstream discoverer nodes without the need to be individually configured with unique layer-3 addresses. Since the devices to discover are in the data path of other devices located downstream from these devices (from the point of view of the discoverer and of the device to detect), it is possible to borrow the layer-3 address of one of these downstream device without interfering with the operation of the network and the downstream devices. The device to discover must therefore be able to relay all of the traffic toward the downstream device from which it borrowed a layer-3 address and conversely, must be able to let upstream traffic from the same downstream device to flow through it.

An example of this would be where the device to discover intercepts each received packet and inspects it to see whether it is intended for the device. This interception is achieved by placing the device inline with the reception path of the device, so that all packets toward and from the downstream device are received by the device. The packet data is inspected by the device to determine whether the packet is intended for the device or whether it should be relayed through an egress port of the device. This can be achieved by placing a specific identifier within a header portion of the packet to denote that the transmitted packet is destined for the device to discover. This means that the device to discover does not require a unique layer-3 address for the discoverer to communicate with the device.

FIG. 1 shows an example of this topology. A discoverer 101 can communicate with a device to discover 102 and a downstream device 109 across a layer-3 network 199. Packets from the discoverer 101 towards the downstream device 109 will always flow through the device to discover 102 and can therefore be intercepted and analyzed by the device to discover 102 without causing any without interfering with the operation of the network or impacting the performance and behavior of the downstream device 109. Analyzed packets with a unique layer-3 identifier other than a layer-3 address are processed by the device to discover 102 and may trigger responses carried in layer-3 packets back to the discoverer 101 or other management actions from the device to discover 102. Packets generated by the device to discover 102 will borrow the layer-3 addressing information of the downstream device 109.

One specific way of implementing the unique layer-3 identifier is as follows: the device to discover 102 monitors the layer-3 traffic between the discoverer 101 and the downstream device 109 (for instance IP packets) and detects when a frame contains a UDP port number matching an Internet Assigned Numbers Authority (IRNA) assigned proprietary UDP port number. When such a packet is detected, further packet processing takes place to fully validate that the packet is destined for the device to discover 102 and not for another device to detect that would be located downstream from the device to discover 102. If the packet does not match the identifier filter, it is forwarded normally on the data path via the egress port of the device to discover 102.

Figure 2:
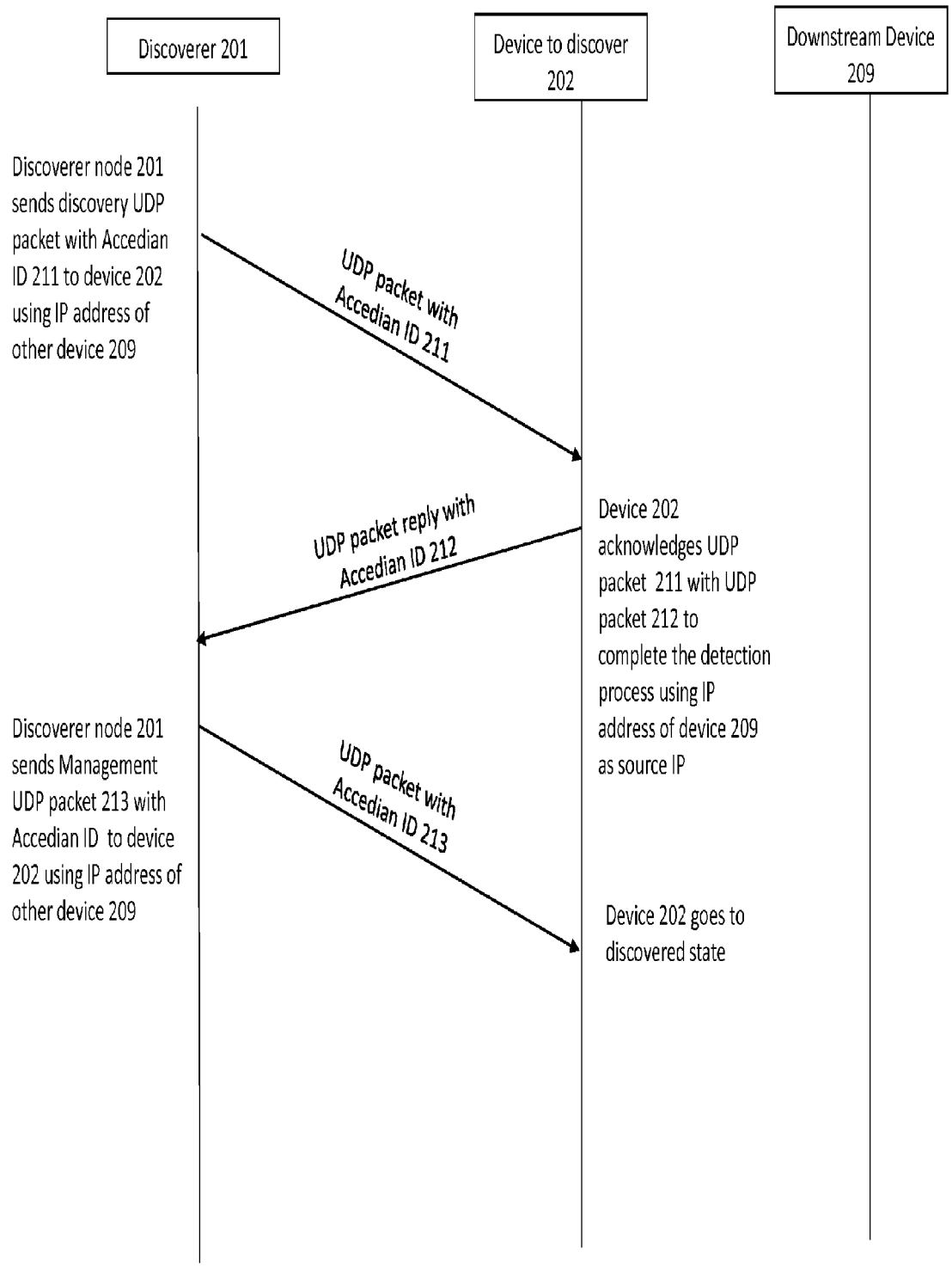
FIG. 2 shows a flow of User Datagram Protocol (UDP) messages exchanged between a discoverer node and the device to discover without the need for a unique IP address being assigned to the device to discover.

In FIG. 2, the flow of layer-3 messages illustrates the discovery process where a single device 202 is to be discovered. More complex scenarios are discussed below. The discoverer 201 has prior knowledge of the layer-3 addresses of downstream devices (e.g., 209) that have been assigned unique layer-3 addresses. For instance, this could be an Evolved Node B (EnodeB) in an LTE network. At some intervals, either fixed or random, the discoverer 201 sends discovery packets 211 encoded as UDP packets with the destination address of a downstream device 209. Each discovery packet 211 uses an IRNA assigned proprietary UDP Port Number. The payload of the discovery packets 211 may include a randomly generated discoverer instance ID to detect a restart of a discoverer 201 since the last time the device 202 was discovered by the discoverer 201 along with other information either in encoded or non-encoded form. The encoding may be provided by any known means, including well-known cryptographic techniques. According to one embodiment of the present invention, if the discoverer 202 is restarted for any reason, including due to a management request, power failure or other reasons, the device 202 reverts to a non-discovered state and can be discovered again.

Whenever a UDP packet with the unique UDP Port Number flows through a device to discover 202 en route toward the downstream device 209, it is intercepted by the device to discover 202 and further analyzed. According to one aspect of the present invention, the device to discover 202 may determine that the UDP packet with the unique IRNA assigned UDP Port Number must be forwarded via the egress port of the device to discover 202. When receiving discovery packets 211, the device to discover 202 will compare the discoverer instance ID (if present) with the previously saved discoverer instance ID (if known). If the device to discover 202 is in a non-discovered state or if the new discoverer instance ID is different from the discovered instance ID used the last time the device to discover 202 was discovered by the discoverer 201, it will remain in the non-discovered state and will reply to the discoverer 201 with an advertisement packet 212 using the IP and MAC address of the downstream device 209 as its source IP and MAC address to indicate the device to discover 202 is now discovered and ready to be controlled, managed and configured by the discoverer 201.

The payload of the advertisement packet 212 may contain proprietary information about the device to discover 202, for instance a serial number, model number and other capabilities of the device to discover 202. The advertisement packet 212 may be sent in an encoded or a non-encoded form. The encoding may be provided by any known means, including well-known cryptographic techniques. The discoverer 201 may then send control, management and/or configuration packets 213 to the device to discover 202 having associated the device to discover 202 with the IP address of the downstream device 209. The device to discover 202 will use this management packet 213 to enter the discovered state. The management packet 213 may include a unique handle assigned to the device to discover 202 by the discoverer 201. This unique handle will be used by all subsequent management packets from the discoverer 201 that are destined for the device to discover 202.

Figure 3:
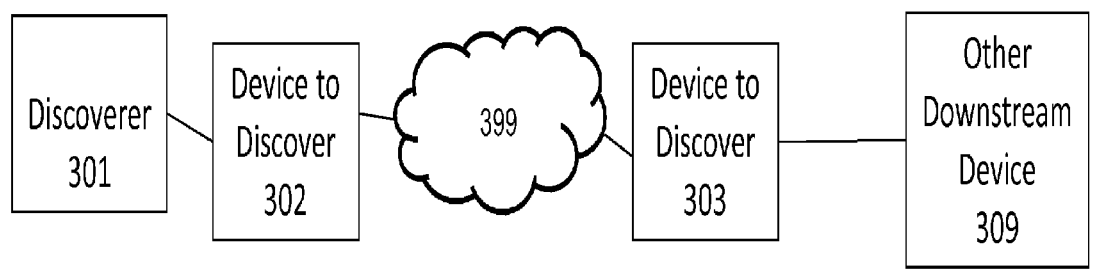
FIG. 3 illustrates a network where multiple devices belonging to the same management domain or operator are ready to be discovered by a discoverer node.

FIG. 3 illustrates a more complex scenario where there are multiple devices to be discovered between a discover 301 and a remote downstream device 309. Discovery and other management packets destined for a device to discover 303 flowing through a device to discover 302 and a network 399 must be able to reach the device to discover 303 seamlessly while other discovery and management packets meant for the device to discover 302 must not reach the device to discover 303. Additionally, packets meant for the downstream device 309 must flow through the device to discover 302, the network 399 and the device to discover 303 and reach that downstream device 309 unaltered. As in FIG. 1, the devices to discover 302 and 303 share the same layer-3 and layer-2 address they borrow from the downstream device 309. As in FIG. 1, the discoverer 301 has prior knowledge of the IP address of the downstream device 309.

The discovery, advertisement and management packets exchanged between a discoverer and a device to be discovered may include additional information in the UDP payload such as a discoverer instance ID to handle the above arrangement where the device to discover 303 is downstream and in-line from the device to discover 302. In order to allow the discoverer 301 to remain in control over the discovery process, each discovered device will only process a discovery packet when it is in a non-detected state or when the discoverer instance ID is different from the previously known discoverer instance ID. Otherwise, when the device to discover 302 is in a discovered state, a discovery packet shall be relayed via the egress port of the device (such as the device to discover 302) until it reaches another device to discover (such as the device to discover 303) or until it reaches the downstream device 309 which should then discard the packet if it does not know how to handle UDP packets with the IRNA UDP Port Number assigned to these packets.

Figure 4:
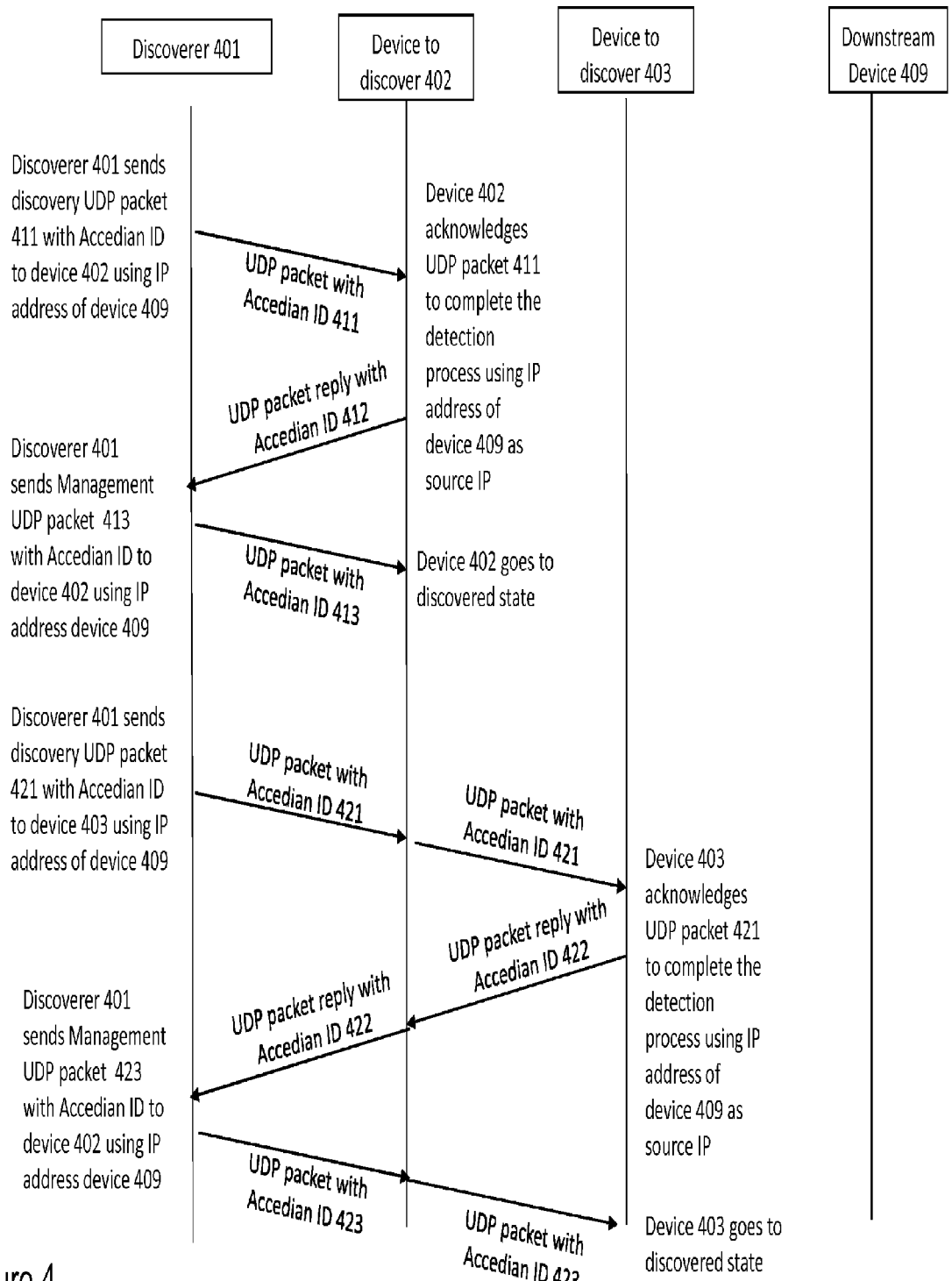
FIG. 4 shows a flow of UDP messages exchanged between a discoverer node and a plurality of devices to discover that belong to the same management domain or operator without the need for a unique IP address being assigned to the devices to discover.

In FIG. 4, the flow of layer-3 messages illustrates the discovery process where a plurality of devices is to be discovered. A discoverer 401 has prior knowledge of the layer-3 addresses of downstream devices that have been assigned unique layer-3 addresses. For instance, this could be an Evolved Node B (EnodeB) in an LTE network. At some intervals, either fixed or random, the discoverer 401 sends a discovery packet 411 encoded as a UDP packet with the destination address of a downstream device 409. The discovery packet 411 uses an IANA assigned proprietary UDP Port Number. The discovery packet may include a discovered instance ID and other information either in encoded or non-encoded form. The encoding may be provided by any known means, including well-known cryptographic techniques.

Whenever a UDP packet with the unique UDP Port Number flows through a device to discover 402 en route toward the downstream device 409, it is intercepted by the device to discover 402 and further analyzed. If the device to discover 402 is in the non-discovered state or if the discoverer instance ID is different from the previously known discoverer instance ID, the device to discover 402 will further analyze the discovery packet 411. Otherwise, if the device to discover 402 is in the discovered state, it must relay the discovery packet 411 via the egress port of the device to discover 402 toward the downstream device 409. When receiving the discovery packet 411, the device to discover 402 will save the discoverer instance ID and will reply with an advertisement packet 412 using the IP and MAC address of the downstream device 409 as its source IP and MAC address to indicate that the device to discover 402 is now ready to be controlled, managed and configured by the discoverer 401.

The payload of advertisement packet 412 may contain proprietary information about the device to discover 402, for instance a serial number, model number and other capabilities of the device to discover 402. The advertisement packet 412 may be sent in with or without encryption. The encryption may be achieved by any known means, including well known cryptographic techniques. The discoverer 401 will then send control, management and/or configuration packets 413 to the device to discover 402 having associated the device to discover 402 with the IP address of the downstream device 409. The device to discover 402 will enter the discovered state and the device to discover 402 will use this management packet 413 to enter the discovered state.

The management packet 413 may include a unique handle assigned to the device to discover 402 by the discoverer and this unique handle will be used by all subsequent management packets from the discoverer 401 that are destined for the device to discover 402. The discoverer 401 then proceeds with the sending of additional discovery packets, including discovery packet 421, with destination IP address set to the IP address of the downstream device 409 to determine whether there are other devices to discover downstream of the device to discover 402 and before (upstream of) the downstream device 409. The discovery packet 421 is encoded with a destination IP address set to the IP address of the downstream device 409. The remainder of the encoding of the discovery packet 421 is as discussed previously with respect to discovery packet 413. Upon receiving the discovery packet 421, the device to discover 402 will determine that it is a discovery packet and, since the device to discover 402 is in the discovered state and the discoverer instance ID is unchanged, it will relay the discovery packet 421 via the egress port of the device to discover 402 toward the downstream device 409.

When the discovery packet 421 reaches a device to discover 403, the discovery packer 421 will be analyzed to determine whether the UDP Port Number is set to the IANA assigned number. Since the device to discover 403 is in the non-discovered state or the discoverer instance ID is changed from the previously saved value at the device to discover 403, the device to discover 403 will determine that the discovery packet 421 is meant for it. The device to discover 403 will prepare an advertisement packet 422 with a source IP and MAC address of the downstream device 409. The device to discover 403 sends the advertisement packet 422, via the device to discover 402, to the discover 401. The advertisement packet 422 may include proprietary information about the device to discover 403 in the UDP payload. The advertisement UDP packet 422 may be sent in an encrypted or non-encrypted form by the device to discover 403. As with device 402, the discoverer 401 may then send a management packet 423 to further control, manage and/or configure the device to discover 403 and the device to discover 403 will use this management packet 423 to enter the discovered state. The management packet 423 is sent to the device to discover 403 via the device to discover 402.

The management packet 423 may include a unique handle assigned to the device to discover 403 by the discoverer 401 and this unique handle will be used by all subsequent management packets from the discoverer 401 that are destined for the device to discover 403. Should a discovery packet be sent by the device to discover 403 after it has entered into the discovered state and with a discoverer instance ID that has not changed, such a discovery packet will be forwarded via the egress port of the device to discover 403 and will reach the downstream device 409. Since the downstream device 409 does not know how to handle packets with the unique UDP Port Number assigned by IRNA, it should simply discard that packet.

Figure 5:
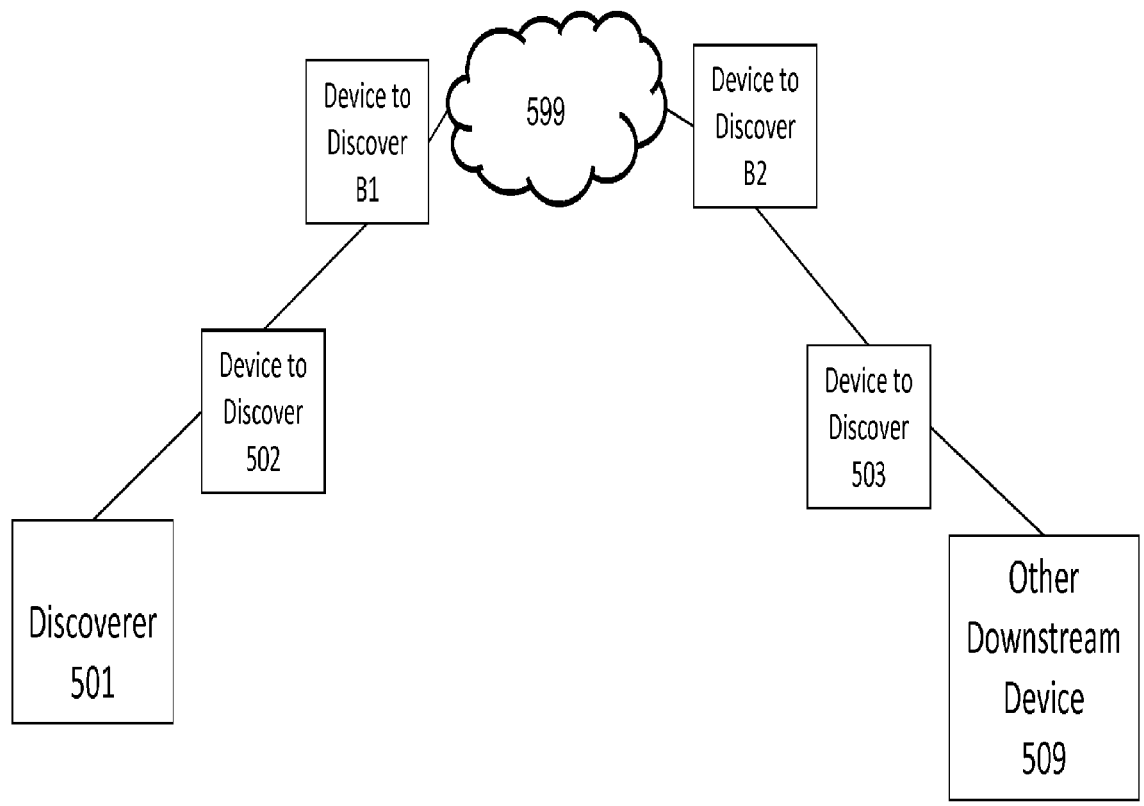
FIG. 5 illustrates a network where multiple devices belonging to multiple management domains or operators are ready to be discovered by a discoverer node.

FIG. 5 illustrates a scenario where there are multiple devices to be discovered between the discoverer 501 and a remote downstream device 509 and where these devices to be discovered belong to distinct management domains. Discovery and other management packets destined for a device to discover 503 flowing through a device to discover 502 and a network 599 must be able to reach the device to discover 503 seamlessly while other discovery and management packets meant for the device to discover 502 must not reach the device to discover 503. Furthermore, devices to discover B1 and B2, although they share the same capability to process management packets from the discoverer 501, shall not act on these management packets since the devices B1 and B2 belong to a different management domain. According to one aspect of the present invention, the devices B1 and B2 may be identical in nature and/or functionality to the devices to discover 502 and 503, but belong to a different network operator than the devices to discover 502 and 503. This may be the case where a third party network operator provides backhaul for a cellular tower, The third party network operator may install Network Interface Devices (NIDs) to monitor the performance for the backhaul segments the third party network operator operates. The main network operator also deploys end to end NIDs to monitor the overall performance of the network. The main network operator would not detect devices B1 and B2 since they do not belong to that operator. Yet, devices B1 and B2 will be in the same path between the discoverer 501 and the downstream device 509. This is the reason for using different domain IDs. In some SOAM protocols, this is sometimes referred to a MEG Level. According to other aspects of the present invention, other types of IDs may be used in case MEG levels are not usable nor desirable depending on implementation.

Finally, packets meant for the downstream device 509 mush flow through the device to discover 502, the device B1, the network 599, the device B2 and the device to discover 503 and reach the downstream device 509 unaltered. As is the case with the embodiments shown in FIGS.

1 and 3, the devices to discover 502 and 503 share the same layer-3 and layer-2 addresses they borrow from the downstream device 509. As is the case with the previous embodiment, the discoverer 501 has prior knowledge of the IP address of the downstream device 509.

Figure 6:
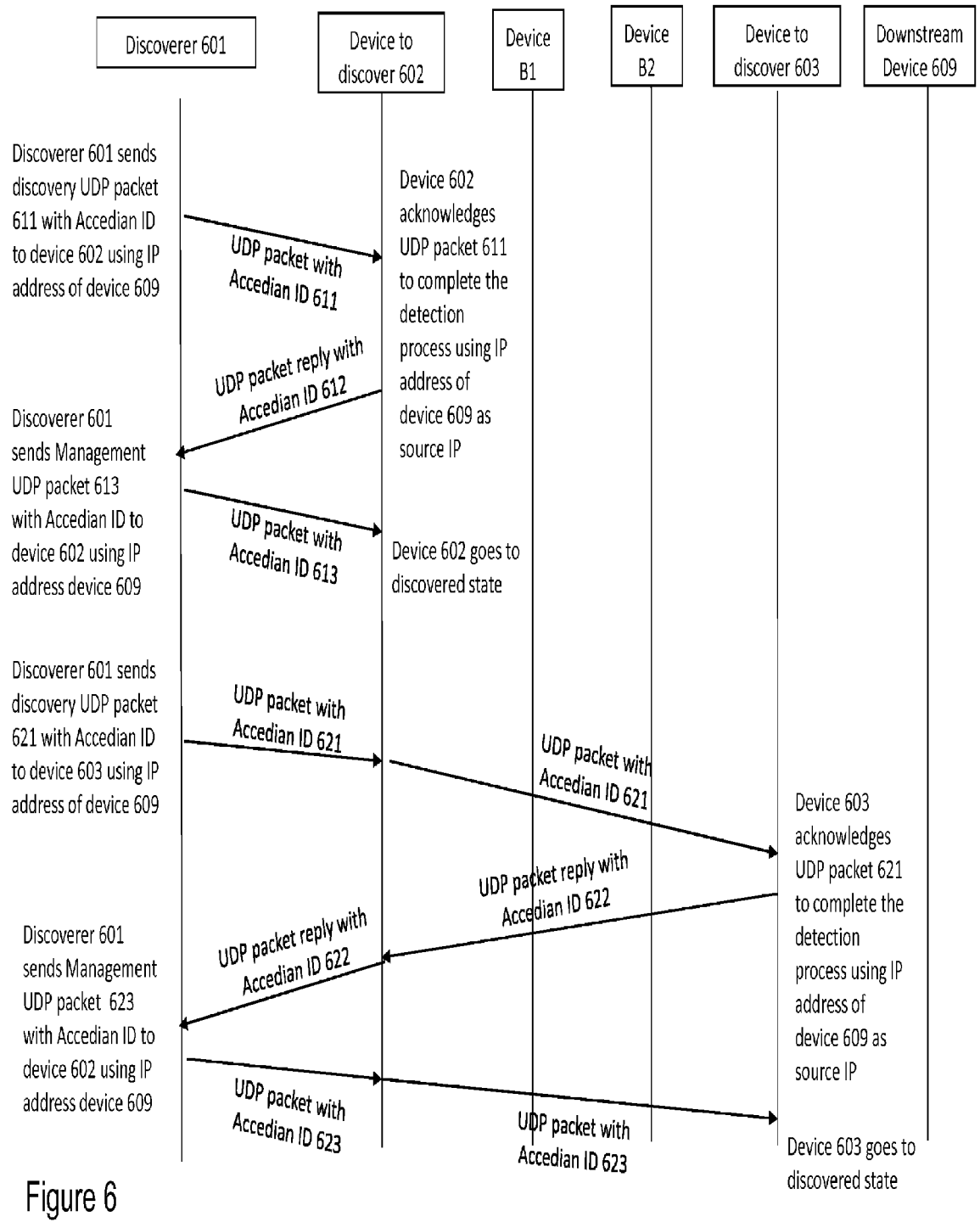
FIG. 6 shows the flow of UDP messages exchanged between a discoverer node and a plurality of devices that belong to different management domains (or operators) without the need for a unique IP address being assigned to the devices to discover.

In FIG. 6, the flow of layer-3 messages illustrates the discovery process where a plurality of devices is to be discovered and where not all devices to be discovered belong to the same management domain. The discoverer 601 has prior knowledge of the layer-3 addresses of downstream devices that have been assigned unique layer-3 addresses. For instance, this could be an Evolved Node B (EnodeB) in an LTE network. At some intervals, either fixed or random, the discoverer 601 sends a discovery packet 611 encoded as a UDP packet with the destination address of the downstream device 609. The discovery packet 611 uses an IANA assigned proprietary UDP Port Number. The discovery packet 611 includes a unique management domain identifier that is known by the devices to discover 602 and 603 and that differs from the management domain known by the devices B1 and B2. The discovery packet 611 may include a discoverer instance ID and other information either in an encoded or a non-encoded form. The encoding may be provided by any known means, including well-known cryptographic techniques. Whenever a UDP packet with the unique UDP Port Number flows through the device to discover 602 en route toward the downstream device 609, it is intercepted by the device to discover 602 and further analyzed. If the device to discover 602 is in the non-discovered state or the discoverer instance ID is different from the previously saved value at the device to discover 602, the device to discover 602 will further analyze the discovery packet 611. Otherwise, if the device to discover 602 is in the discovered state, it must relay the discovery packet 611 via the egress port of the device to discover 602 toward the downstream device 609. When receiving the discovery packet 611, the device to discover 602 will save the discoverer instance ID and will reply to the discoverer 601 with an advertisement packet 612 using the IP and MAC address of the downstream device 609 as its source IP and source MAC address to indicate the device to discover 602 is now ready to be controlled, managed and configured by the discoverer 601.

The payload of advertisement packet 612 may contain proprietary information about the device to discover 602, for instance a serial number, model number and other capabilities of the device to discover 602. The advertisement packet 612 may be sent in an encrypted or non-encrypted form, wherein the encryption is achieved via any known techniques, including cryptographic techniques. The discoverer 601 will then send control, management and/or configuration packets 613 to the device to discover 602 having associated device 602 with the IP address of device 609 and the device to discover 602 will enter the discovered state and the device to discover 602 will use this management packet to enter the discovered state. The management packet 613 may include a unique handle assigned to the device to discover 602 by the discoverer 601 and this unique handle will be used by all subsequent management packets from the discoverer 601 that are destined for the device to discover 602.

The discoverer 601 then proceeds with the sending of additional discovery packets with destination IP address set to the IP address of the downstream device 609 to determine whether there are other devices to discover downstream of the device to discover 602 and before the downstream device 609. The discovery packet 621 is encoded with a destination IP address set to the IP address of the downstream device 609 and with a management domain known to the device to discover 603 (same as the device to discover 602). The remainder of the encoding of the discovery packet 621 is as discussed previously with regard to, e.g., packet 213. Upon receiving the discovery packet 621, the device to discover 602 will determine that it is a discovery packet and since it is in the discovered state, it will relay the discovery packet 621 via the egress port of the device to discover 602 toward the downstream device 609.

When the discovery packet 621 reaches the device B1, regardless of the state of the device B1, it will relay the discovery packet 621 via its egress port since it belongs to a different management domain. The same step will take place when the discovery packet 621 reaches the device B2. The device B2 will simply relay the discovery packet 621 via its egress port since the device B2 belongs to a different management domain. When the discovery packet 621 ultimately reaches the device to discover 603, it will be analyzed to determine whether the UDP Port Number is set to the IANA assigned number. Since the device to discover 603 is in the non-discovered state, the device to discover 603 will determine that discovery packet 621 is meant for it and will prepare an advertisement packet 622 with a source IP and a source MAC address of the downstream device 609 and may include proprietary information about the device to discover 603 in the UDP payload.

The advertisement UDP packet 622 may be sent in the clear or encrypted form by the device to discover 603. As with the device to discover 602, the discoverer 601 may then send a management packet 623 to further control, manage and/or configure the device to discover 603. The device to discover 603 will use this management packet 623 to enter the discovered state. The management packet 623 may include a unique handle assigned to the device to discover 603 by the discoverer 601 and this unique handle will be used by all subsequent management packets from the discoverer 601 that are destined for the device to discover 603. Should a discovery packet be seen by the device to discover 603 after it has entered into the discovered state and with an unchanged discoverer instance ID, it will be forwarded via the egress port of the device to discover 603 and reach the downstream device 609. Since the downstream device 609 does not know how to handle packets with the unique UDP Port Number assigned by IRNA, it should simply discard that packet. Any further management packets from the discoverer 601 that flow through the devices B1 and B2 should be relayed via the egress port of these devices B1 and B2 unaltered since they belong to a different management domain.

In an alternate embodiment, the packet exchange between a discoverer and a device to discover takes place inside a layer-3 tunnel such as: MPLS, L2TPv3, GTP-U, etc. terminated at a remote device. The device to discover is programmed to decode the header of the layer-3 tunneling protocol and determine if the special UDP Port Number assigned by the IRNA is present. When a layer-3 tunnel is used, the device is also programmed to generate the appropriate tunnel header to be able to reach the discoverer using the IP address borrowed from a downstream device.

In yet another embodiment, the discoverer inserts a Time to Live (TTL) value in each discovery packet. Upon receiving a discovery packet at a device to discover (or that is already discovered) and with the same management domain identifier as the device to discover, the TTL value is decremented by 1 and if it does not reach a value of 0 (zero), the discovery packet (with the decrement TTL value) will be forwarded via the egress port of the device to discover. Otherwise, the TTL value is 0 (zero) and the processing of the discovery packet and the remainder of the 3-way handshake by the device (advertisement packet from the device and a management reply from the discoverer) takes place as previously described. Whenever a discoverer detects a new device, it will begin the next discovery sequence with a TTL value incremented by 1 (one) from the previously used TTL value. If the discoverer does not detect a new device within a specific timeout period, it will resume the discovery process after a random or fixed delay and with a TTL value reset to 1.

In an embodiment, the discoverer may also be used as a management proxy on behalf of the devices it has discovered. This is particularly useful when the discovered devices can only be reached inside a layer-3 tunneling protocol such as: MPLS, L2TPv3, GTP-U, etc. When operating in such a management proxy mode, the discoverer may present a list of devices along with their unique identifiers (for instance a serial number) and could be used as the source of management packets for each of the devices. In this role, the discoverer could also act as an aggregation point for management information for the discovered devices.

The first and second devices to discover and the discoverer are each coupled to a processor. The present invention includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGA's), digital signal processors (DSP's), microcontrollers, and the like, programmed according to the teachings of the exemplary embodiments of the present invention, as is appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits or by interconnecting an appropriate network of conventional component circuits, as is appreciated by those skilled in the electrical arts. Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present invention can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of configuring a management device in a communication network, the management device comprising an upstream port and a downstream port, the method comprising:
   continuously monitoring IP packets received at the upstream port;
   receiving at the upstream port an IP packet transmitted by a discoverer, the IP packet destined for a downstream device accessible by the management device through the downstream port, the IP packet comprising an identifier;
   examining the identifier and determining that the IP packet is intended for the management device; and
   transmitting through the upstream port an advertisement packet to the discoverer.

2. The method of claim 1 wherein the IP packet further comprises a discover ID.

3. The method of claim 1 wherein the downstream device has an IP address and the management device borrows the IP address of the downstream device; and
   the advertisement packet has a source address of the IP address of the downstream device.

4. The method of claim 1 wherein the downstream device has a MAC address and the management device borrows the MAC address of the downstream device; and
   the advertisement packet has a source address of the MAC address of the downstream device.

5. The method of claim 1 further comprising the management device changing from an undiscovered state to a discovered state.

6. The method of claim 2 further comprising receiving at the upstream port a management reply from the discoverer, the management including the discoverer ID.

7. A method of configuring a management device in a communication network, the management device comprising an upstream port and a downstream port, the method comprising:
    continuously monitoring IP packets received at the upstream port, the management device storing a first discoverer ID;
    receiving at the upstream port an IP packet transmitted by a discoverer, the IP packet destined for a downstream device accessible by the management device through the downstream port, the IP packet comprising an identifier and a second discoverer ID;
    examining the identifier and determining that the first discoverer ID is different from the second discoverer ID, and that the IP packet is intended for the management device; and
    transmitting through the upstream port an advertisement packet to the discoverer.

8. The method of claim 7 wherein the downstream device has an IP address and the management device borrows the IP address of the downstream device; and
    the advertisement packet has a source address of the IP address of the downstream device.

9. The method of claim 7 wherein the downstream device has a MAC address and the management device borrows the MAC address of the downstream device; and
    the advertisement packet has a source address of the MAC address of the downstream device.

10. The method of claim 7 further comprising receiving at the upstream port a management reply from the discoverer, the management including the discoverer ID.

11. The method of claim 7 further comprising the management device updating the first discoverer ID with the second discoverer ID after transmitting the advertisement packet to the discoverer.

12. The method of claim 7 further comprising receiving at the upstream port a management reply from the discoverer, the management including the second discover ID.

13. The method of claim 7 wherein the management device is initially in a discovered state.

14. The method of claim 13 further comprising the management device remaining in the discovered state after transmitting the advertisement packet to the discoverer.

* * * * *